(12) United States Patent
Suh

(10) Patent No.: US 8,070,211 B2
(45) Date of Patent: Dec. 6, 2011

(54) AUTOMATIC DEPLOYING CAR COVER SYSTEM FOR A CAR EQUIPPED WITH AN AUTOMATIC OPENING/CLOSING TRUNK

(76) Inventor: Ted Justin Suh, Los Angeles, CA (US)

( * ) Notice: Subject to any disclaimer, the term of this patent is extended or adjusted under 35 U.S.C. 154(b) by 124 days.

(21) Appl. No.: 11/998,785

(22) Filed: Dec. 3, 2007

(65) Prior Publication Data
US 2009/0140541 A1 Jun. 4, 2009

(51) Int. Cl.
*B60J 11/00* (2006.01)
*B60J 11/02* (2006.01)
(52) U.S. Cl. ............... 296/136.01; 296/136.12; 150/166
(58) Field of Classification Search ............. 296/136.01, 296/136.02, 136.07, 136.1, 136.12, 136.13; 150/166
See application file for complete search history.

(56) References Cited

U.S. PATENT DOCUMENTS

| | | | | |
|---|---|---|---|---|
| 4,432,581 A | * | 2/1984 | Guma | 296/136.03 |
| 4,795,206 A | * | 1/1989 | Adams | 296/98 |
| 4,966,406 A | * | 10/1990 | Karasik et al. | 296/98 |
| 5,230,545 A | * | 7/1993 | Huang et al. | 296/95.1 |
| 5,855,406 A | * | 1/1999 | Vargo | 296/136.03 |
| 6,672,643 B1 | * | 1/2004 | Brodskiy et al. | 296/98 |
| 6,997,503 B2 | * | 2/2006 | Fukagawa | 296/136.13 |
| 7,008,002 B2 | * | 3/2006 | Rhea et al. | 296/136.01 |
| 7,077,453 B1 | * | 7/2006 | Walker | 296/76 |
| 7,464,982 B1 | * | 12/2008 | Lin et al. | 296/136.01 |
| 2004/0201244 A1 | * | 10/2004 | Neuer et al. | 296/136.1 |
| 2006/0162873 A1 | * | 7/2006 | Dao | 160/122 |
| 2006/0214465 A1 | * | 9/2006 | Chau | 296/136.1 |
| 2009/0183809 A1 | * | 7/2009 | Wiegel | 150/166 |

\* cited by examiner

*Primary Examiner* — Jason S Morrow
(74) *Attorney, Agent, or Firm* — James Michael Smedley, Esq.; James M Smedley LLC

(57) ABSTRACT

An automatic car cover system, driven by electric motors, for a car, which is equipped with an automatic opening/closing trunk lid, is provided. The automatic car cover system according to current application is comprised of one cover runner, one holster, one holster casing, one guide, one cover sheet, and one cover sheet un-folder. The cover runner is a small electric motor driven vehicle equipped with caterpillars, which are comprised of magnetic plates covered with rubber. The holster pushes out/rewinds the cover runner, the guide, and the cover sheet with un-folder. The holster comes out of and goes into trunk of the car with aid of a line connected to a reverse power motor installed in the holster.

9 Claims, 20 Drawing Sheets

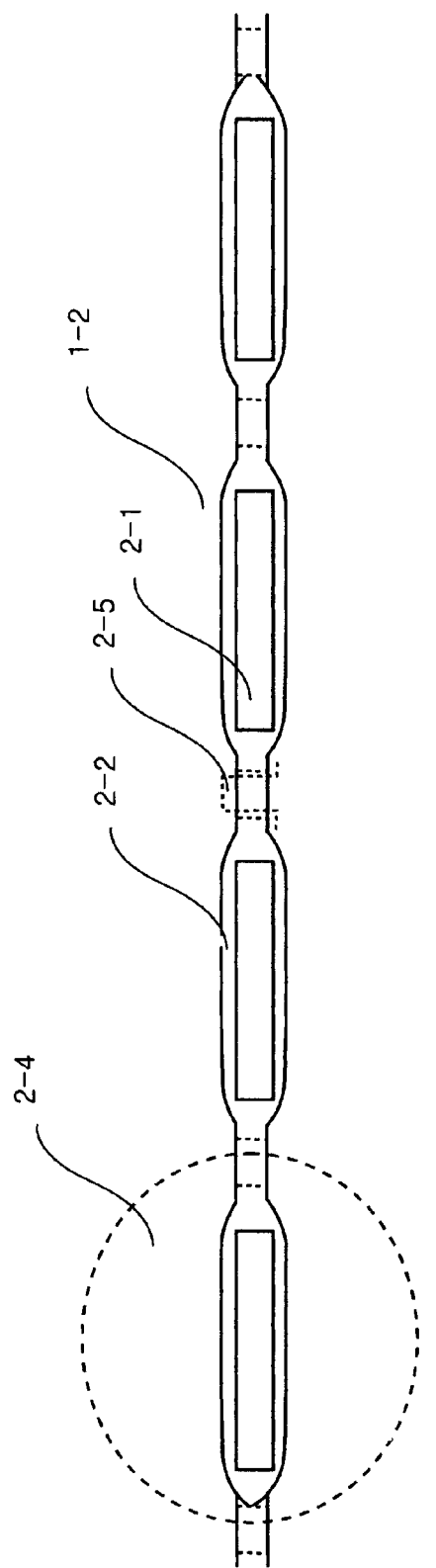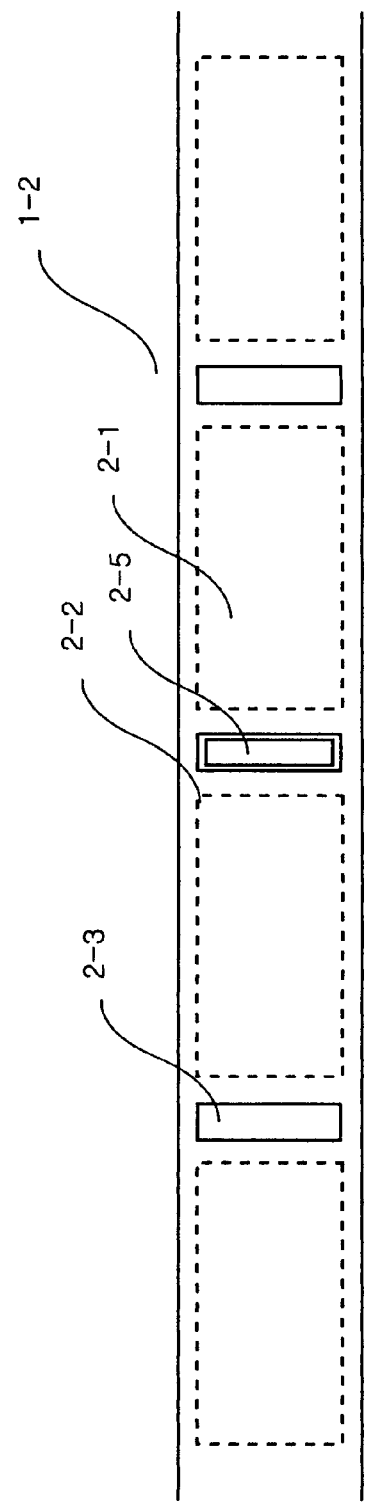
Fig. 3
Fig. 4

AUTOMATIC DEPLOYING CAR COVER SYSTEM FOR A CAR EQUIPPED WITH AN AUTOMATIC OPENING/CLOSING TRUNK

FIELD OF THE INVENTION

Current application relates to a car cover system, especially relates to a car cover system that is stored in an automatically open/closing trunk of a car and deploys automatically.

BACKGROUND OF THE INVENTION

Most of car covers on the market is a simple plastic sheets deployed manually by the owner of the car. Some of recent car covers are installed inside of trunk of a car and re-winded automatically by a spring re-winder that also is installed inside thereof. Especially, for bad weather, when it rains or in a snow storm, it is very hard to deploy the cover alone even for an adult man. Meanwhile, some expensive luxury cars are provided with a trunk that opens and closed automatically. However, such automatic trunk system faces its limit when the car cover stored therein is a manually deploying one. It is almost impossible to deploy a car cover when it rains while the owner of the car holds luggage in both of his/her hands. If hails comes down just after shopping, there is no way to protect the luxury car from the hail stones with a manually deploying car cover. If with a car cover deploys automatically, it will protect the luxury cars even at the worst situation. It is purpose of the current application to provide a car cover that comes out of a car's trunk, deploys and restored into the trunk automatically by a simple press of a key.

DESCRIPTION OF PRIOR ARTS

U.S. Pat. No. 6,964,446 to Porter illustrates a retractable vehicle cover apparatus for covering a vehicle comprises an elongated, hollow housing, and axle disposed therein for rotation about a central axis, and an elongated cover having a proximal end coupled with the axle and also having a distal end.

U.S. Pat. No. 6,502,889 to Fukagawa illustrates a general-purpose trunk storing type body cover device for car includes a main device body formed so that a body cover for car can be delivered and wound up and a stand part on which the main device body is installed.

U.S. Pat. No. 6,513,858 to Li, et al. illustrates a spring tensioned roller and spaced tension bar have a vehicle cover folded in half and rolled around the spring tensioned roller.

U.S. Pat. No. 6,131,643 to Cheng, et al. illustrates a sun shield device for automobile that includes a tubular central axle, a revolving sleeve which has a diameter larger than and a length shorter than that of the central axle being rotatably supported around the central axle, a shading sheet engaged on and wound around the revolving sleeve, an auto-rewinding device which is installed between the central axle and the revolving sleeve for driving the revolving sleeve to rotate so as to automatically rewind the shading sheet around the revolving sleeve.

U.S. Pat. No. 5,597,196 to Gibbs illustrates a system for the deploying and storing of an automobile cover. The system is provided with a roller assembly which can be made to be pivotally disposed about the axis of an axle. The operator can quickly deploy the cover by pulling it from the back of the trunk over the trunk lid, and over the car, securing it to front bumper. The trunk can be closed after the cover is secured to the front bumper, thus securing the system inside the trunk.

None of the prior art illustrates an automatically deploying and rewinding car cover that is stored in an automatic opening/closing trunk of a car. Instead the entire prior art illustrate manually deploying car covers. It is because no technology is provided that enables automatic dragging of a car cover along the sophisticate surface of a car. Many kind of break through technology are assembled to enable such complex jobs and introduced in current application.

SUMMARY OF THE INVENTION

Most of car covers on the market is a simple plastic sheets deployed manually by the owner of the car. Some of recent car covers are installed inside of trunk of a car and re-winded automatically by a spring re-winder that also is installed inside thereof. However, it is not an easy job to take out the car cover from the trunk and deploy that all over the car. Especially, for bad weather, when it rains or in a snow storm, it is very hard to deploy the cover alone even for an adult man. Meanwhile, some expensive luxury cars are provided with a trunk that opens and closed automatically. However, it is almost impossible to deploy a car cover when it rains while the owner of the car holds luggage in both of his/her hands. If there is a car cover deploys automatically, it will protect the luxury cars even at the worst situation. It is purpose of the current application to provide a car cover that comes out of a car's trunk, deploys and restored into the trunk automatically by a simple press of a key. The automatic car cover according to current application is comprised of one cover runner, one holster, one holster casing, one guide, and one cover sheet. The cover runner is a small electric motor driven vehicle equipped with a caterpillar comprised of magnetic plates covered with rubber. The holster stores and pushes out/rewind the cover runner from and to trunk of the car with aid of the guide connected to a reverse power motor installed in the holster and rewind the cover sheet to store therein.

BRIEF DESCRIPTION OF DRAWINGS

FIG. 3 is a side view of an endless track for a cover runner of an automatic car cover according to current application.

FIG. 4 is an over view of an endless track for a cover runner of an automatic car cover according to current application.

DETAILED DESCRIPTION OF THE PREFERRED EMBODIMENT

Current application discloses many novel technologies for realizing full automatic deploying car cover, which was impossible before because of many limitations of technologies known to far. The automatic deploying car cover system of the current application is comprised of one cover runner, one holster, one holster casing, one guide, one cover sheet, and one cover sheet un-folder.

1. Cover Runner (1)

Figure 1:
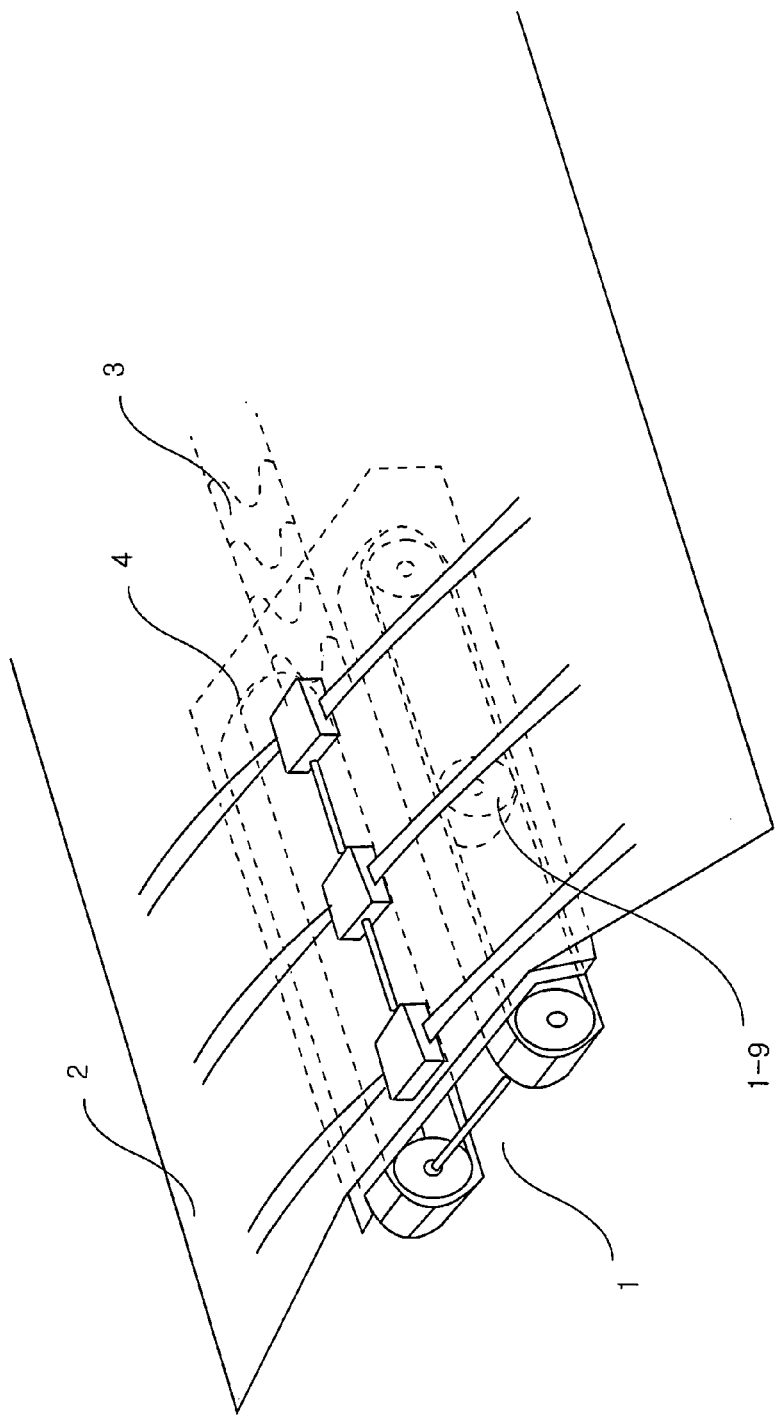
FIG. 1 is a perspective view of a cover runner for an automatic car cover system according to current application connected to a car cover sheet and a guide.

FIG. 1 is a perspective view of a cover runner (1) for an automatic car cover system according to current application connected to a car cover sheet (2) and a guide (3). Front end of the cover sheet (2) is firmly adhered to front end of the cover runner (1) and the cover sheet (2) places over the cover runner (1). Rear end of the cover runner (1) is connected with the guide (3). Cover sheet un-folder (14) is attached on the center of upper surface of the cover sheet (2) along the length thereof.

Figure 2:
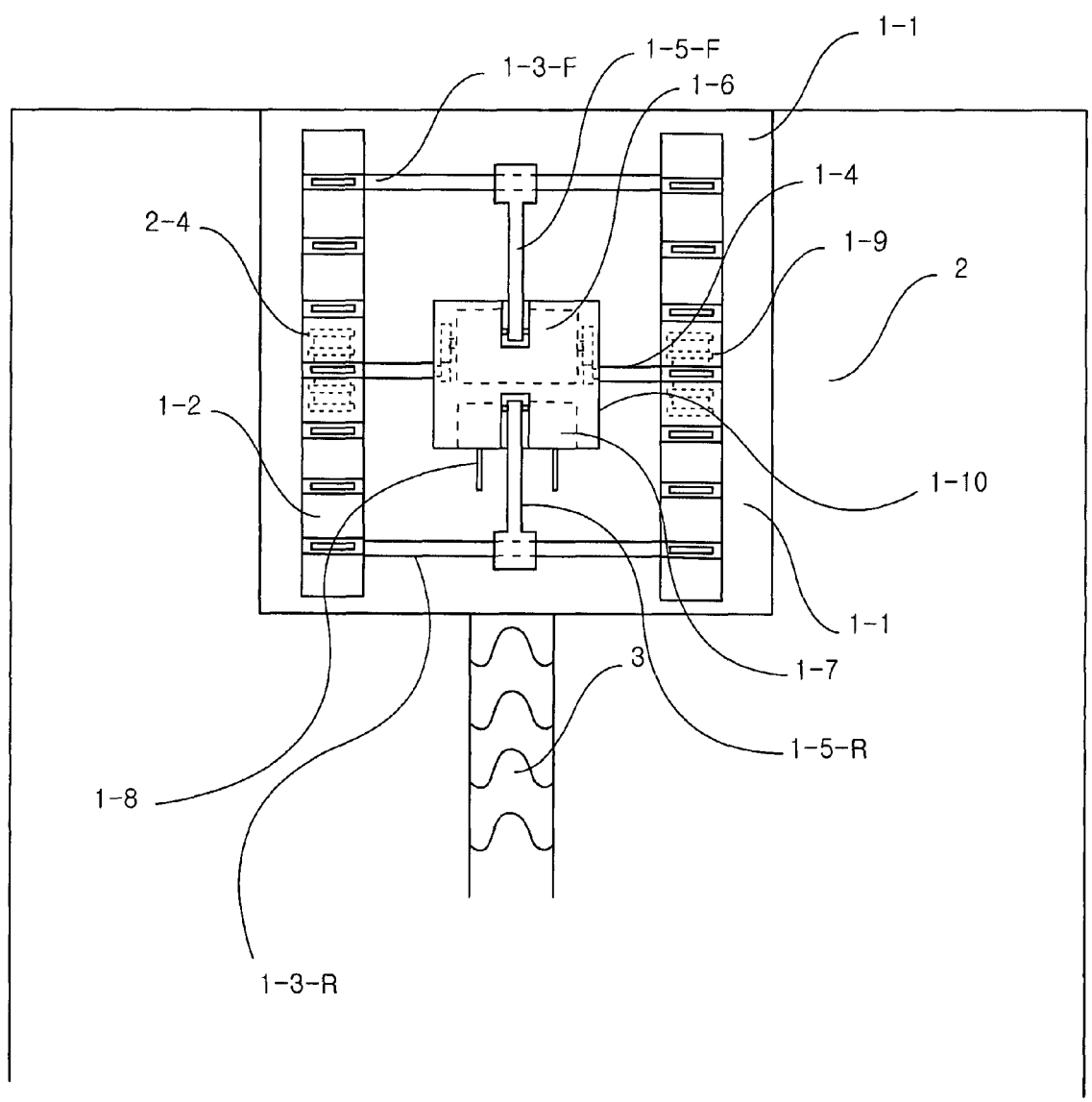
FIG. 2 is a bottom view of a cover runner for an automatic car cover according to current application connected to a car cover and a guide.

FIG. 2 is a bottom view of a cover runner (1) for an automatic car cover system according to current application connected to a car cover (2) and a guide (3). The cover runner (1) is comprised of an upper panel (1-1), two endless tracks (1-2), two cross shafts of front cross shaft (1-3-F) and rear cross shaft (1-3-R), one power transfer shaft (1-4), two vertical shafts of front vertical shaft (1-5-F) and rear vertical shaft (1-5-R) and one electric motor (1-6) that operates reversibly by radio signal. The radio signal operating electric motor (1-6) is fixed to the upper panel (1-1) by proper means and equipped with rechargeable battery (1-7) therein and two radio signal receiving antennas (1-8) are protruded out of the motor horizontally. The radio signal receiving antenna (1-8) works as plug (1-8') for recharging the battery (1-7). The power transfer shaft (1-4) is connected to a shaft of the radio signal operating electric motor (1-6) by gears at the center thereof. Both ends of the power transfer shafts are connected to each of a gear shape wheel (1-9) at the center of the endless track (1-2). The front cross shafts (1-3-F) connects two gear shape wheels (1-9') that locate at the frontal side of the cover runner (1) and the rear cross shaft (1-3-R) connects other two gear shape wheels (1-9") that locate at the rear side of the cover runner (1). The front cross shaft (1-3-F) is pivotally connected to one end of the front vertical shaft (1-5-F) at the center thereof and the rear cross shaft (1-3-R) is also pivotally connected to one end of the rear vertical shaft (1-5-R) at the center thereof. The other end, not connected to the front cross shaft, of the front vertical shaft (1-5-F) and the other end of the rear vertical shaft (1-5-R) are pivotally connected a housing (1-10) for the radio signal operating reversible electric motor (1-6). Such pivotally connected structure combined with the materials for the endless track enables the cover runner (1) climbing over the rectangle surface of the trunk lid.

FIG. 3 is a side view of an endless track (1-2) for a cover runner (1) of an automatic car cover according to current application. The caterpillar is comprised of pluralities of square plates of anisotropic permanent magnets (2-1). Each anisotropic permanent magnetic plate (2-1) has magnetic flux density of greater than 7000 Gauss. Each anisotropic permanent magnetic plate (2-1) is separately embedded in a conveyer belt (2-2) of rubbery polymer, including but not limited to rubbery silicon and polyurethane. The polymer conveyer belt (2-2) is connected in one body forming a circular band shape.

Figure 5:
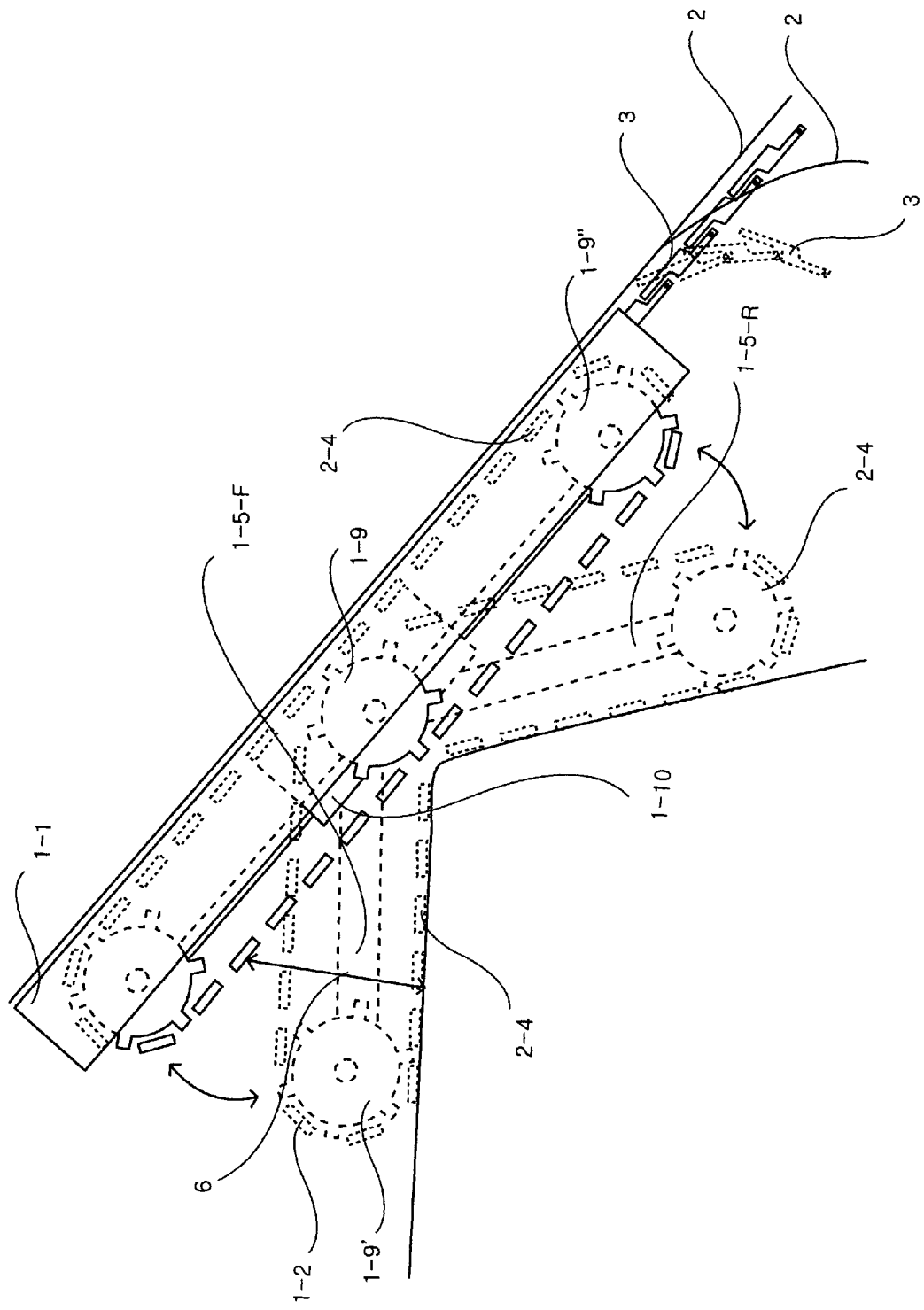
FIG. 5 is a side view of the cover runner that shows how the endless track of the cover runner climbs up the vertical edge of the trunk lid.

FIG. 4 is an over view of a caterpillar (1-2) for a cover runner (1) according to current application. Though polymer conveyer belt (2-2) is connected in one loop, a slit (2-3) is formed between two neighboring cells (2-4) of the anisotropic permanent magnetic plate (2-1) embedded in conveyer belt (2-2) of rubbery polymer. Gears (2-5) on each gear shape wheels (1-9), (1-9') and (1-9") are engaged to the slits (2-3) and propel the polymer conveyer belt (2-2). FIG. 5 is a side view of the cover runner (1) that shows how the endless track (1-2) of the cover runner can climb up the vertical edge of the trunk lid.

None of the vehicles that introduced before the current application can climb up a fine vertical metal surface and then change the direction to a horizontal surface though the vehicle may be pushed up the vertical surface by a proper means.

However, the cover runner (1) of the current application has strong anisotropic permanent magnetic plates (2-1) embedded in a sticky polymer conveyer belt (2-2) and is connected to a guide (3) that bends inwardly only. Combination of these structures enables the cover runner (1) climb up the vertical surface of a car's trunk and change the direction horizontally.

Figure 6:
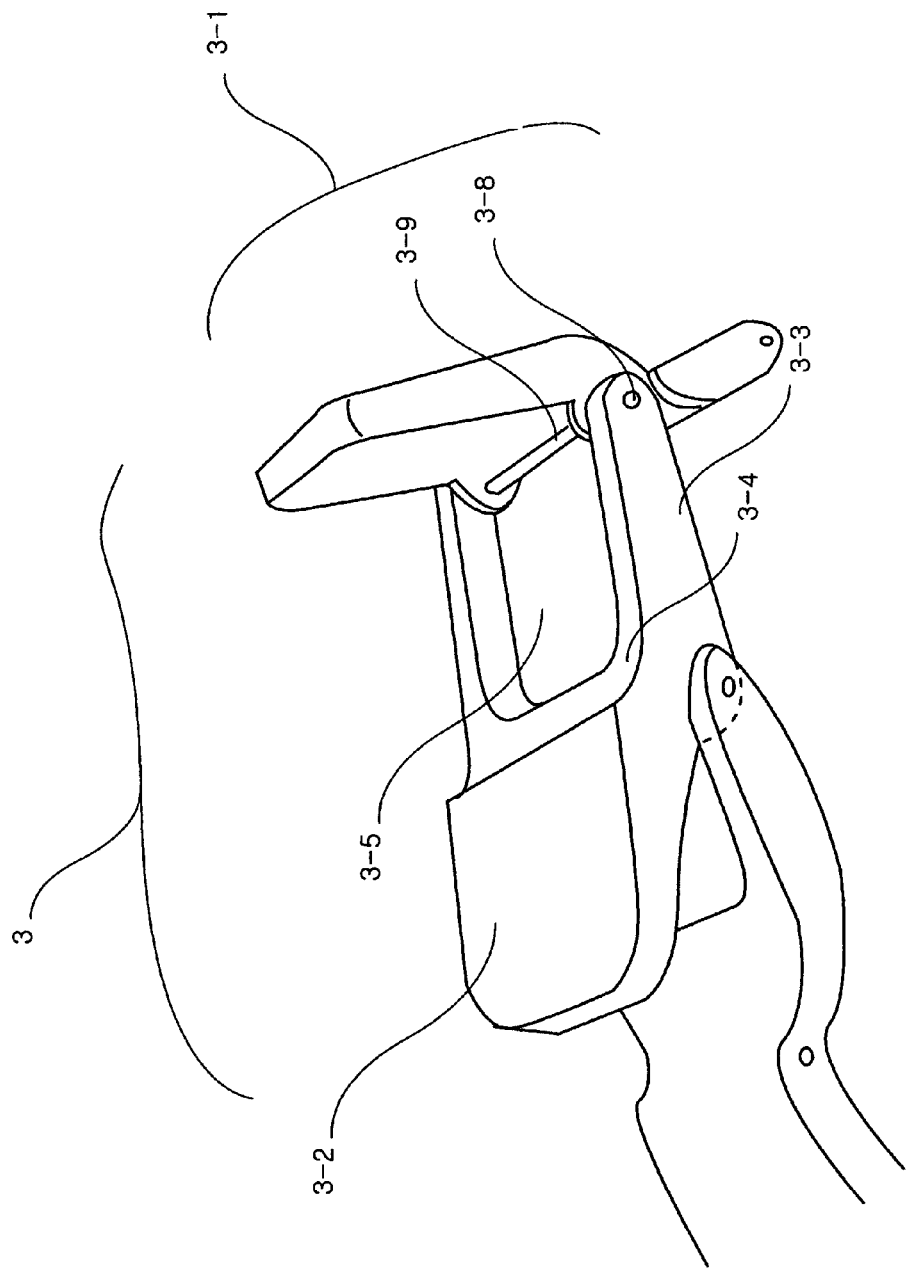
FIG. 6 is a perspective view of a guide for an automatic car cover according to current application.
Figure 7:
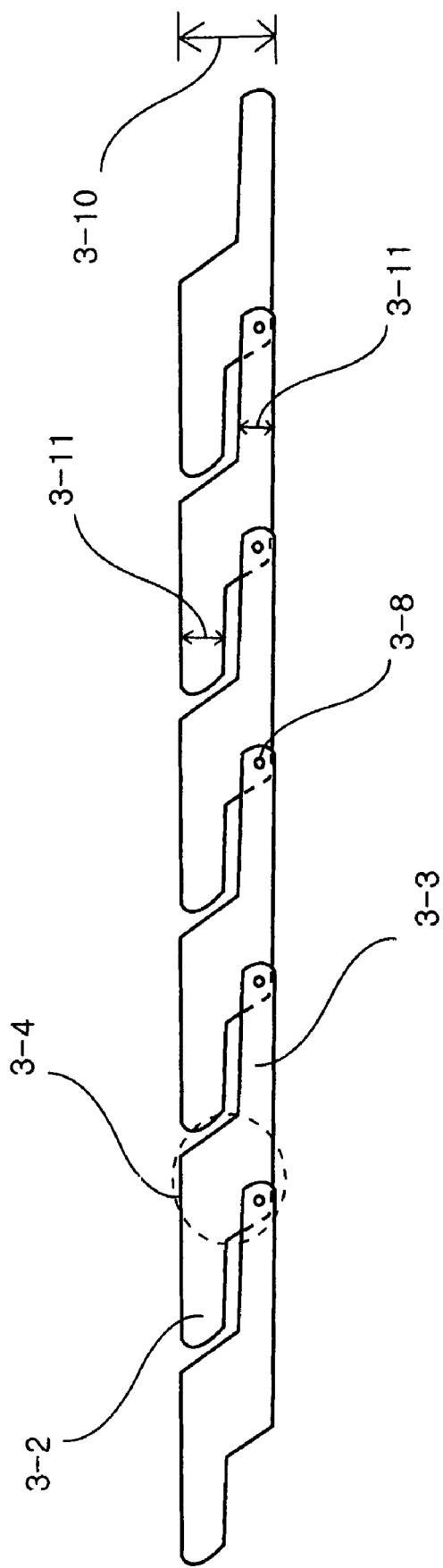
FIG. 7 is a side view of a guide for an automatic car cover according to current application.
Figure 8:
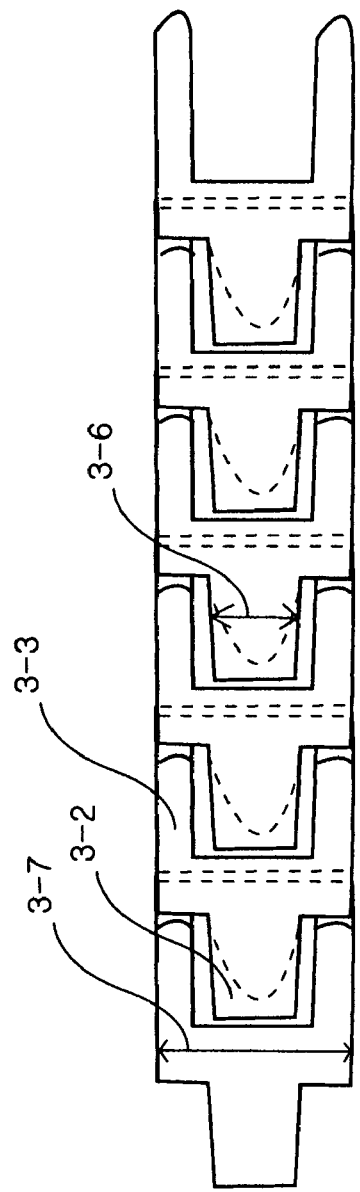
FIG. 8 is an over view of a guide for an automatic car cover according to current application.
Figure 9:
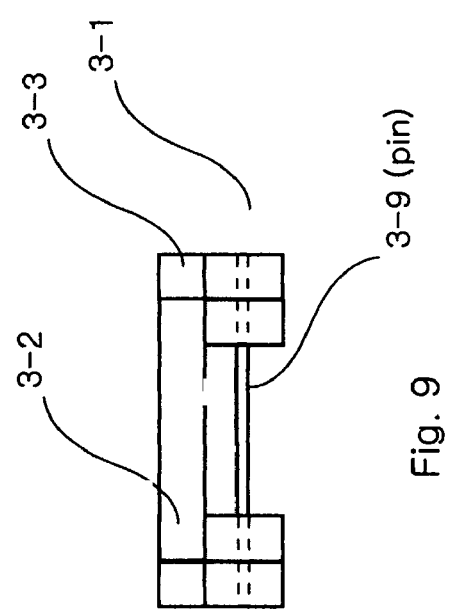
FIG. 9 is a front view of a member of the guide for an automatic car cover according to current application.

FIG. 6 is a perspective view of a guide (3) for an automatic car cover according to current application. And FIGS. 7 and 8 are a side view and an over view of a guide (3) for an automatic car cover according to current application, respectively. FIG. 9 is a front view of a member (3-1) of the guide (3) for an automatic car cover according to current application.

The guide (3) according to current application is a kind of chain that is folded in one direction only. Each member (3-1) of the guide (3) has a unique shape shown in FIG. 6. Each member (3-1) has a front portion (3-2), a rear portion (3-3) and middle portion (3-4) comprising one body of the member (3-1). The front portion (3-2) is a simple square plate and the rear portion has a void (3-5) to allow the front portion (3-2) and the middle portion (3-4) moves pivotally up and down. Width (3-6) of the front portion (3-2) is narrower than the width (3-7) of the rear portion (3-3). Side view of the middle portion (3-4) is in a rectangular shape and has connection holes (3-8) for receiving a connection rod (3-9) there through. Thickness (3-10) of the middle section (3-4) is 3 mm and thickness (3-11) of the front portion (3-2) and the rear portion (3-3) are identical as 1.5 mm. Each member (3-1) of the guide (3) is pivotally connected to the next member (3-1) via the connection rod (3-9) that penetrates the connection holes (3-8).

Since area of the void (3-5), developed on the rear portion (3-5), is smaller than the area of the front portion (3-2), the guide bends only inwardly.

In FIG. 5, when the cover runner (1) climb up the vertical surface of a car's trunk, the endless track (1-2) is positioned parallel to the upper panel (1-1) of the cover runner (1). Then the strong magnetic force induced by pluralities of the anisotropic permanent magnetic plates (2-1) in the endless track sticks the cover runner (1) to the vertical surface of the trunk lid. At this position, the guide (3) pushes up the cover runner (1) by a driving force that comes from electric un-winding of the guide (3) by a holster (4), which will be described in detail later. Meanwhile, the cover runner (1) propels forward itself by the radio signal operating electric motor (1-6). As a result, the cover runner (1) sticks to a vertical metal surface by the strong magnetic force of the endless track (1-2) and pushed up by the two driving forces that come from the guide (3) and the radio signal operating electric motor (1-6) installed inside of the cover runner (1). As shown in FIG. 1 and FIG. 5, the cover sheet (2) is connected to the cover runner (1) thereover. At this stage of climbing up the vertical region of the car's trunk, the weight of the cover sheet (2) released from the holster (4) is negligible compared to the pushing powers from the cover runner (1) and the guide (3).

When the cover runner (1) reaches the upper edge of a car's trunk lid (5), the endless track (1-2) try to stick to the metal surface of the trunk lid (5). As the number of cells (2-4) of the anisotropic permanent magnetic plate (2-1) embedded in conveyer belt (2-2) of rubbery polymer increases, the attraction force (6) between the permanent magnetic plates (2-1) in the cells (2-4) and the horizontal surface of the car's trunk lid (5) increases. Then the front vertical shaft (1-5-F) allow the front portion of the endless track (1-2) adhere to the horizontal metal surface of the car's trunk lid (5). Meanwhile the rear vertical shaft (1-5-R) allows the rear portion of the endless track (1-2) adhere to the vertical surface of the car's trunk lid (5). At this position, the guide (3) starts to bend inwardly because the holster (4) pushed the guide (3) and the cover sheet (2) suppresses the guide (3) to bend inwardly.

In addition to the fold-ability of the front and rear vertical shafts of (1-5-F), (1-5-R), the force balance of the attraction force (6), pushing force for the guide (3), weight of the cover sheet (2), and the self propel of the cover runner (1) enables the cover runner (1) turn 90 degrees from vertical position to horizontal position.

It was impossible before the current invention in any kind of technology before an artificial intelligence microprocessor is applied.

2. Holster (4)

Figure 10:
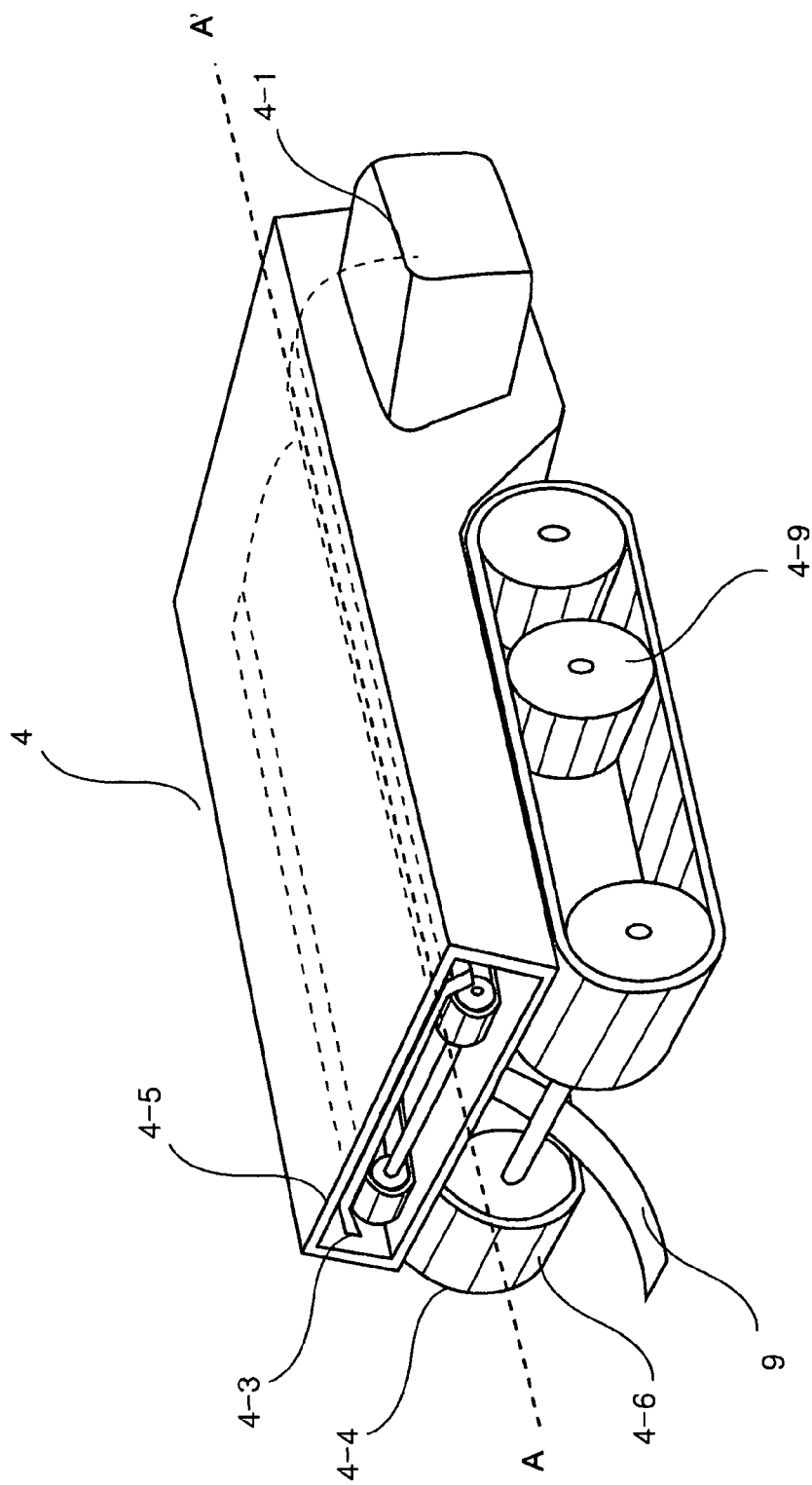
FIG. 10 is a perspective view of a holster for an automatic car cover according to current application.
Figure 11:
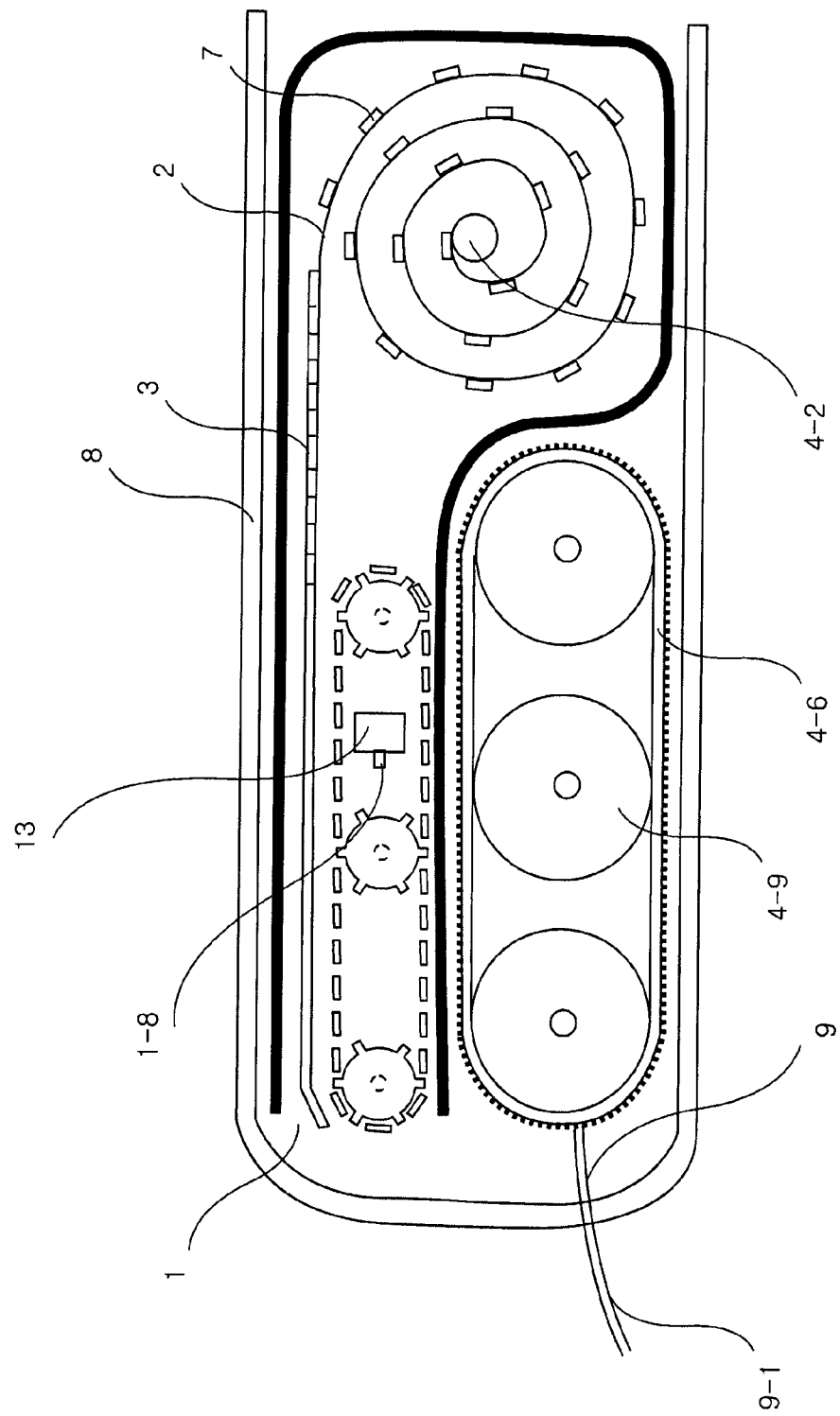
FIG. 11 is a cross-sectional side view along line A-A' in FIG. 10 of a holster for an automatic car cover according to current application.
Figure 12:
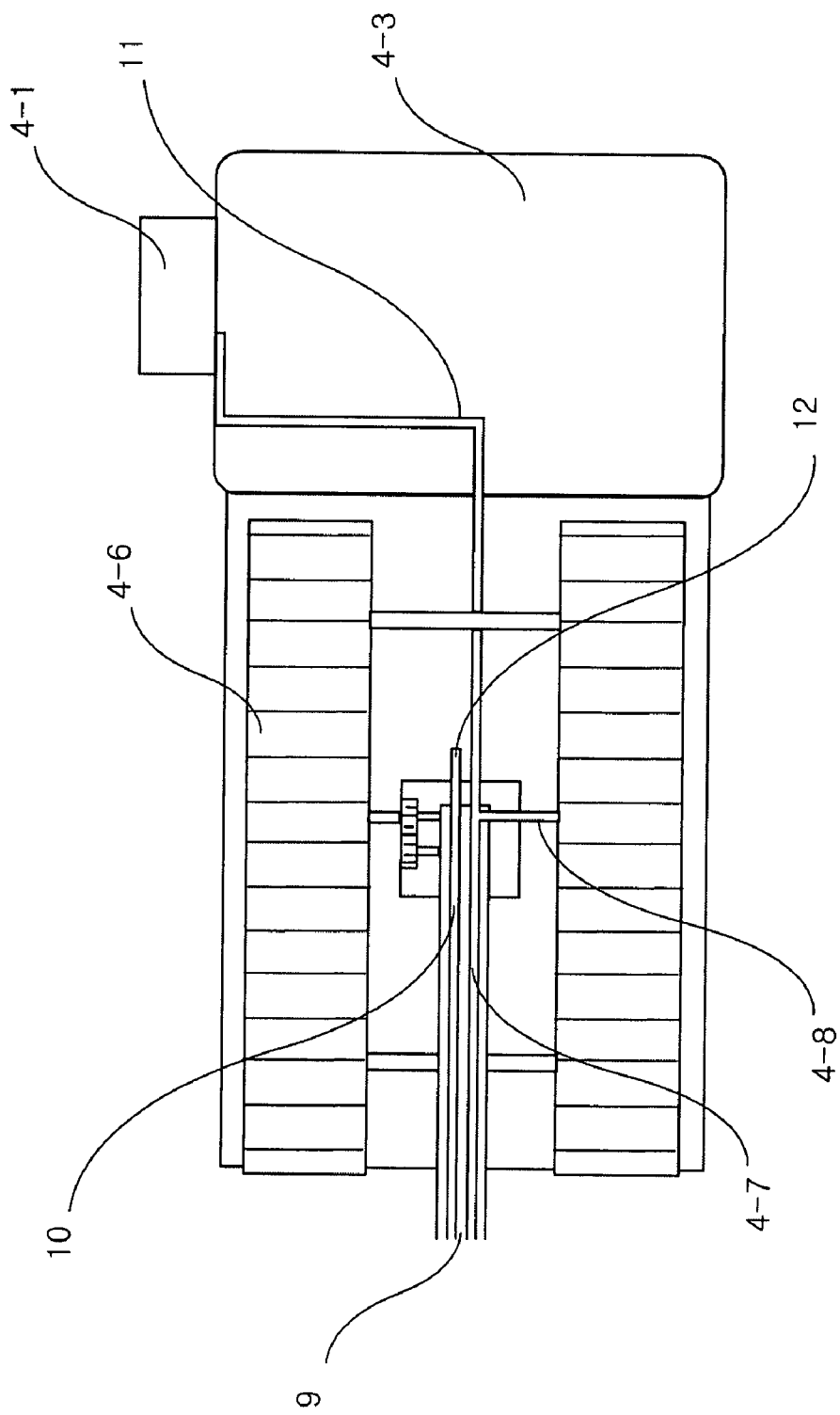
FIG. 12 is a bottom view of a holster for an automatic car cover according to current application.

FIG. 10 is a perspective view of a holster (4) for an automatic car cover according to current application. FIG. 11 is a cross-sectional side view along line A-A' in FIG. 10 and FIG. 12 is a bottom view of the holster (4).

The holster (4) is a means that pushes out, rewinds and stores the cover runner (1), the guide (3), the cover sheet (2) and the cover sheet unfolder (7) with the aid of a reverse electric motor (4-1) driven reversible winder (4-2). The holster (4) is divided into two major portions. One portion is a storing portion (4-3) and the other is a propel portion (4-4). The storing portion is comprised of a string case (4-5), the reversible electric motor (4-1), and the reversible winder (4-2). The propel portion (4-4) is comprised of two rubber belt endless tracks (4-6) and a reversible electric motor (4-7). The holster (4) is connected to a holster housing (8) by a flexible electric power line (9) one end (9-1) of which is connected to a main power of the car. The other end (9-2) of the flexible power line (9) is connected to the reversible electric motor (4-7). However, the middle of the flexible power line (9) is wound to a horizontal shaft (4-8) that connects two wheels (4-9) that moves the rubber endless track (4-6). So the flexible power line (9) is reversibly wind able according to the movement of the holster (4). In the flexible power line (9) three pairs of power wires are provided. One pair of the power wires (10) supply electricity to the reversible electric motor (4-7) and the other pair of power wires (11) supply electricity to the other reversible electric motor (4-1) for reversible winder (4-2).

The third pair of power wires (12) supplies electricity to a re-charger (13) that re-charges the battery (1-7) for the radio signal operating reversible electric motor (1-6) of the cover runner (1). Therefore, if the car cover of the current application is not deployed, the cover runner is stored inside of the holster (4) and the plug (1-8') for recharging the battery (1-7) is engaged to the re-charger (13). If the car runs, electricity is automatically supplied to the re-charger (13) and the battery (1-7) for the cover runner (1) is recharged.

Figure 13:
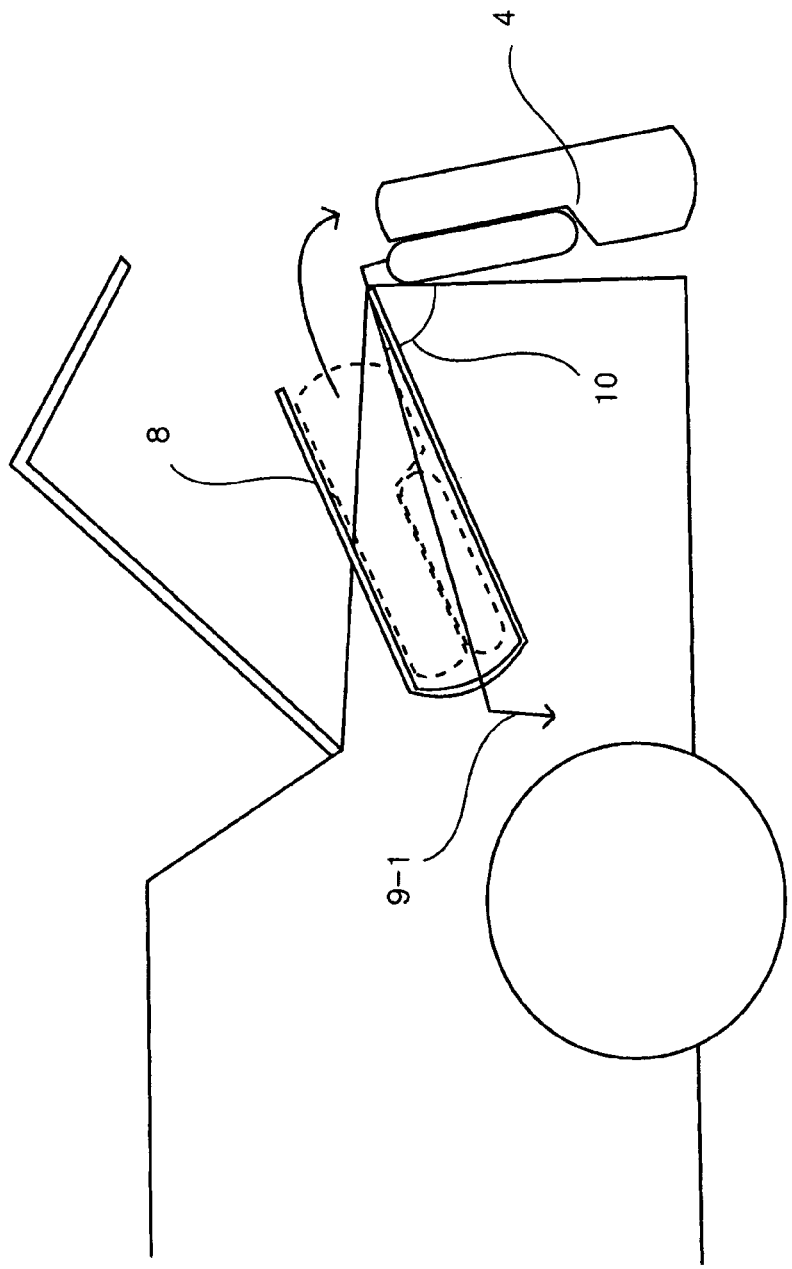
FIG. 13 is a schematic drawing showing holster comes out of holster housing and trunk.

FIG. 13 is a schematic drawing showing holster comes out of holster housing (8) and trunk of a car. The holster housing (8) is firmly installed inside of a car's trunk with an angle (10) of 30 to 75 degrees. Open end of the holster housing (8) reaches the rear end of the trunk opening. If the trunk is open and electricity is supplied to the holster through the flexible power line (9), the holster (4) climbs up the holster housing (8). Meanwhile, the flexible power line (9) is released from the horizontal shaft (4-8) of the holster's (4) caterpillar (4-6). As the weight center of the holster (4) comes out of the trunk, the holster freely drops downward out of the trunk. However, the holster is hanged to the car's body via the flexible power line (9).

3. Cover Sheet (2)

Figure 14:
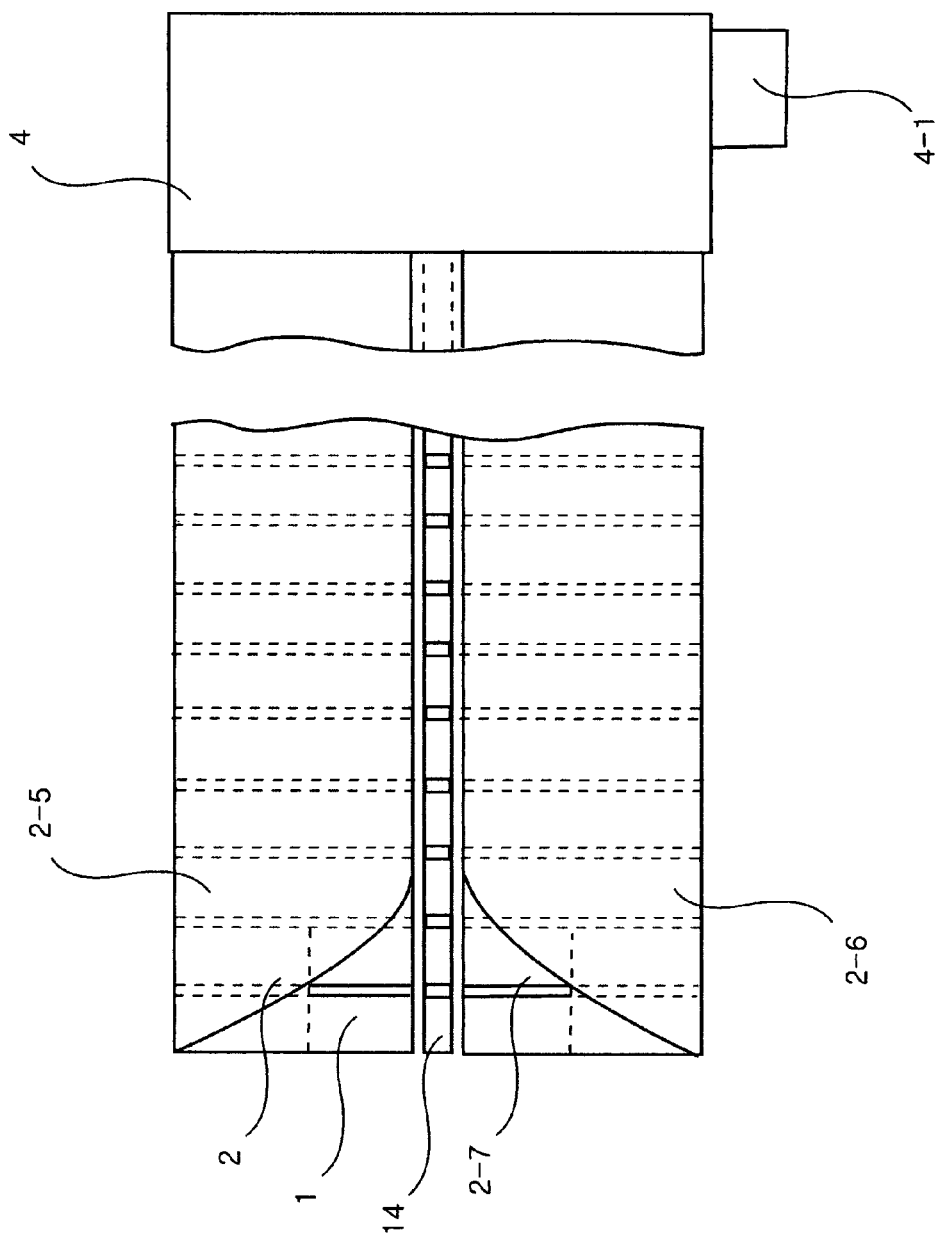
FIG. 14 is an over view of a car cover sheet of current application stretched from the holster.

FIG. 14 is an over view of a car cover sheet of the current application stretched from the holster (4). When the holster (4) reaches the lowest position out of the trunk, the trunk lid (5-1) is closed and then electric power is supplied to the reversible electric motor (4-1) of the holster (4). At the same time radio signal from the car owner's remote control key activates the reversible electric motor (1-6) of the cover runner (1). Then the cover runner (1) pulls and the reversible electric motor (4-1) of the holster (4) pushes the guide (3), the cover sheet (2), and the cover sheet deploying means (14). Both sides (2-5) and (2-6) of the cover sheet (2), which cover the side surface of the car, is folded to meet at the center of the outer surface (2-7) of the cover sheet (2) to reduce the width of the holster housing (8). The cover runner (1) climbs up the vertical surface of the trunk lid (5-1) and proceeds to the horizontal surface of the trunk lid (5-1) as shown in FIG. 5.

Figure 15:
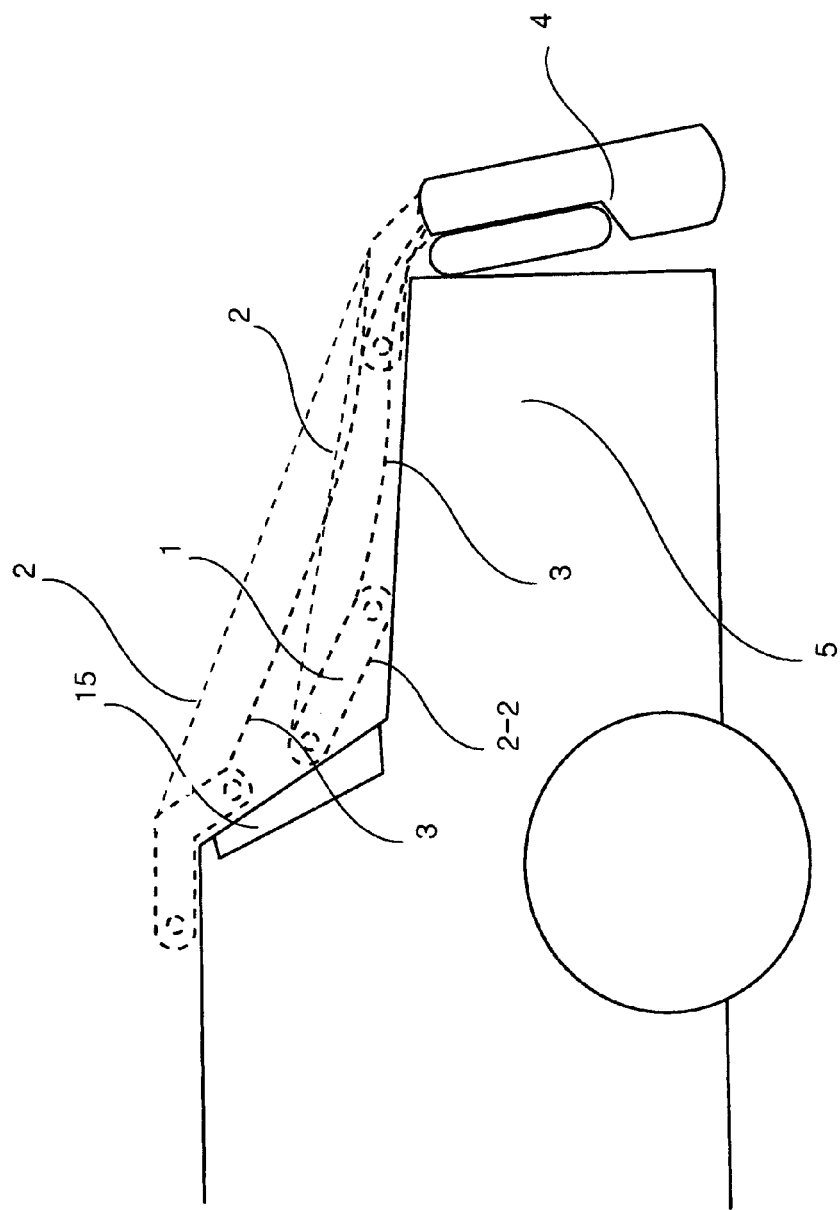
FIG. 15 is a schematic drawing showing how the cover runner climbs up the car outer surface.

FIG. 15 is a schematic drawing showing how the cover runner (1) climbs up the car outer surface. Even after overcome the 90 degree folded surface of the car's trunk lid (5), there remains another barrier of climbing up glass of a rear window (15) of the car. If the front of the cover runner reaches the glass of the rear window (15), the conveyer belt (2-2) of rubbery polymer provides friction to the glass of the rear window (15). At this position, the guide (3) pushes, the rubbery endless track (1-2) of the cover runner (1) provides a friction to climb up, and the weight of the cover sheet (2) presses down the cover runner. By the balance of the three forces the cover runner (1) can climb up the rear window. After that climbing up the rear portion of the car's upper body is accomplished by the same principle as applied for climbing up the trunk lid (5).

Until the cover runner (1) reaches to the front end of the car, the cover sheet (2) is drawn out as shown in the FIG. 14

4. Cover Sheet Deploying Mean (14).

Figure 16:
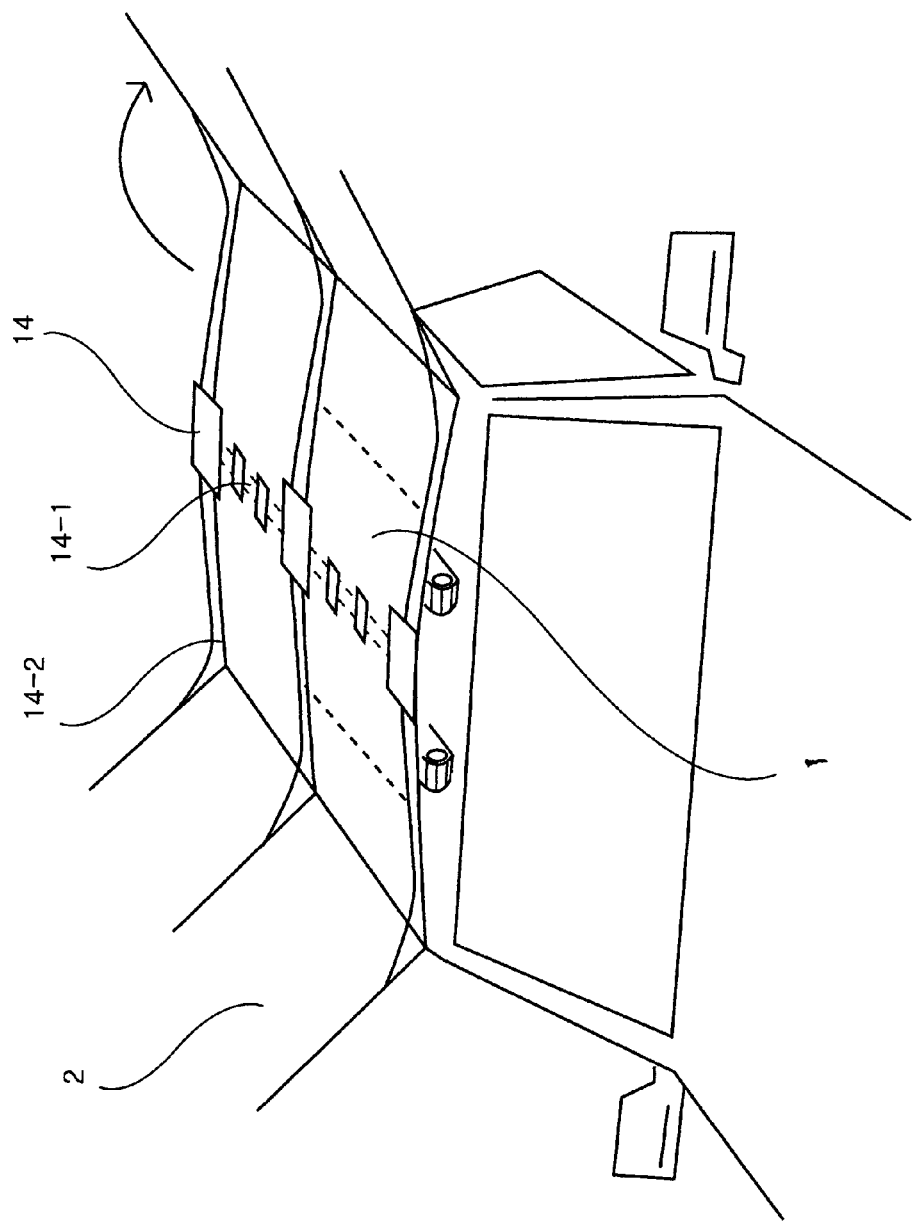
FIG. 16 is a perspective drawing of a car cover sheet according to current application unfolding

Once the cover runner (1) reaches to the front end of a car, the cover sheet (2) is deployed to cover the car's side area. FIG. 16 is a perspective drawing of a car cover sheet (2) according to current application unfolding. On the outer surface of the cover sheet, the cover sheet deploying mean (14) is attached. The cover sheet deploying mean (14) is comprised of an un-folding pusher (14-1) and pluralities of un-folding wings (14-2).

Figure 17:
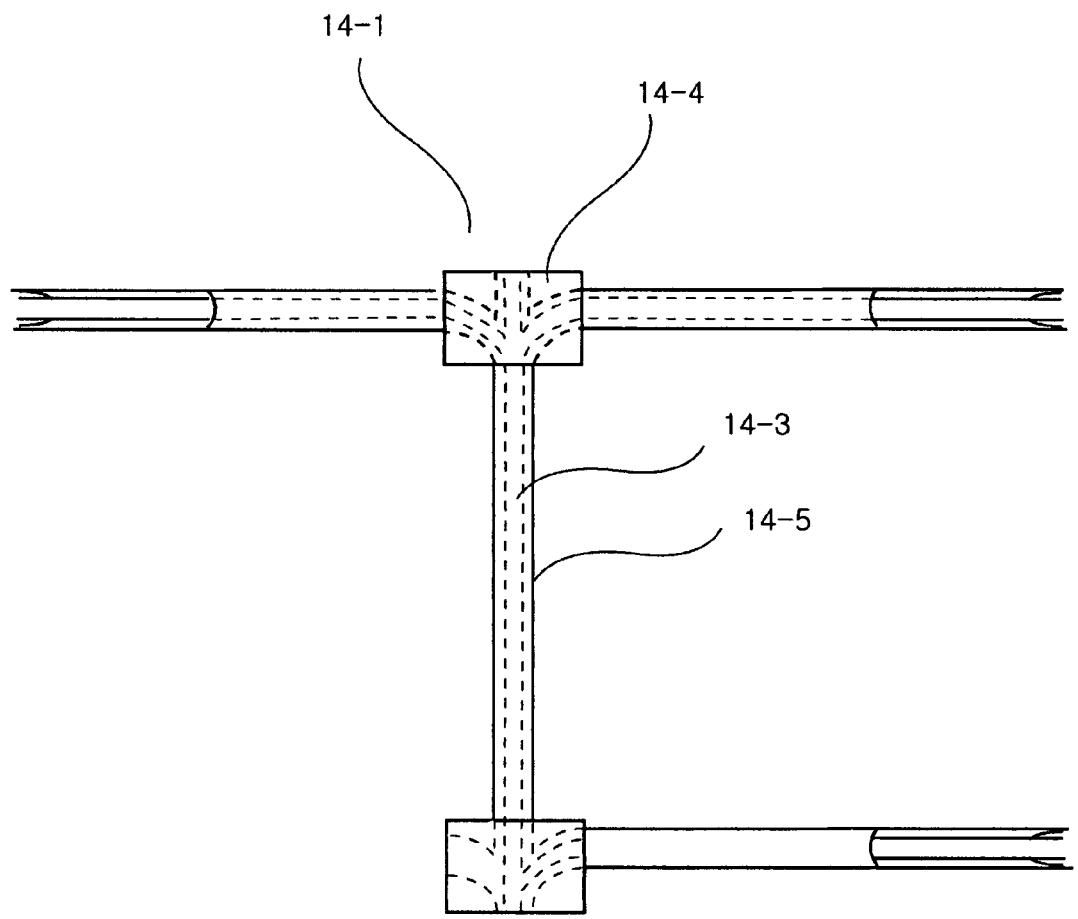
FIG. 17 is an over view of unfolding pusher for the car cover sheet according to current application.
Figure 18:
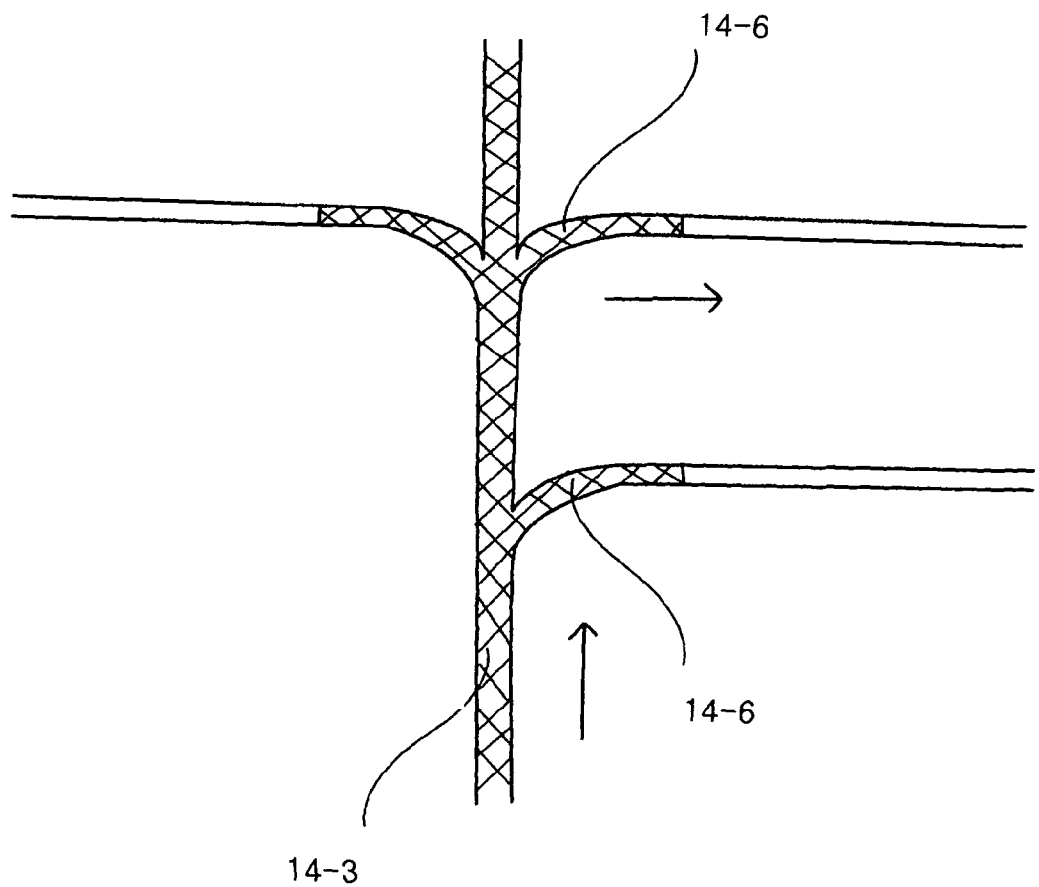
FIG. 18 is an over view of pushing rod for the unfolding pusher for the car cover sheet according to current application.

FIG. 17 is an over view of unfolding pusher (14-1) for the car cover sheet (2) according to current application. FIG. 18 is an over view of pushing rod (14-3) for the unfolding pusher for the car cover sheet (2). The unfolding pusher (14-1) for the car cover sheet (2) is comprised of pluralities of solid connectors (14-4), pluralities of flexible plastic tubes (14-5) that connect each connector (14-4) serially, and a long branched pushing rod (14-3) that pass through the connectors (14-3) and the flexible tubes (14-5). Each connector (14-4) has four way holes, two of them are developed straight along the longitudinal direction of the pusher (14-1) and the other two of them are developed with a slope to the longitudinal direction.

The pushing rod (14-3) is a long flexible rod made with bundle of plastic threads. The pushing rod (14-3) is flexible to the horizontal direction but stiff to the vertical direction. Therefore, if the pushing rod (14-3) is pushed upward in the drawings, the branches (14-6) of the pushing rod (14-3) stretched horizontally due to the holes that are developed with a slope to the longitudinal direction.

Figure 19:
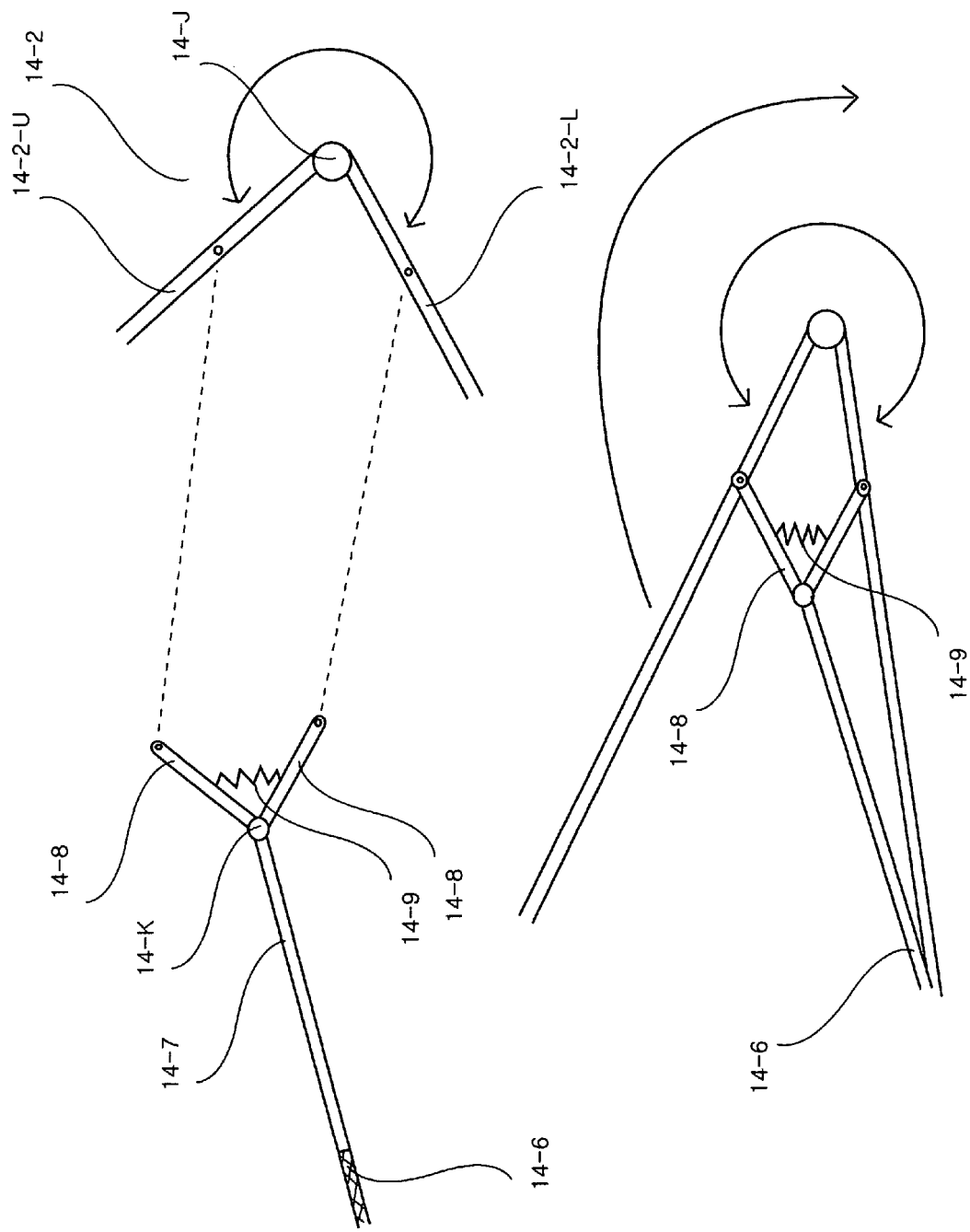
FIG. 19 is an enlarged perspective drawing of an unfolding wing for the car cover sheet according to current application

FIG. 19 is an enlarged perspective drawing of an unfolding wing (14-2) for the car cover sheet according to current application. The unfolding wing (14-2) is pivotally connected to a clamp (14-7). One end of the clamp (14-7) is connected to the branch (14-6) of the pushing rod (14-3) and the other end is equipped with two arms (14-8) that pivotally connected. A spring (14-9) connects the two arms (14-8) to limit the opening of the two arms. Other end of he two arms (14-8) are pivotally connected to the unfolding wing (14-2). The unfolding wing is divided into an upper wing (14-2-U) and a lower wing (14-2-L). Those two wings are pivotally connected to rotate over 300 degrees. The deploying mean (14) works as follows:

The guide (3) and the deploying mean (14) are attached on the inner side and outer side of the cover sheet (2) respectively. The length of the pushing rod (14-3) is 5 centimeter longer than the length cover sheet (2) and 10 centimeter longer than that of the guide (3) plus the cover runner (1). One end of the guide, opposite to the cover runner, is not connected to the re-winder (4-2). Meanwhile, the other end of the cover sheet (2) is connected to the re-winder. That 10 centimeter portion is wound deeply inside of the reversible re-winder (4-2). Therefore, if the cover runner (1) reaches at the most distant site from the holster (4) and the reversible electric motor (4-1) still turns to the same direction, then the cover sheet (2) is re-winded slightly. But, the pushing rod (14-3) is still released from the re-winder (4-2).

Then, the pushing rod (14-3) is pushed forward compared to the connectors (14-4) and the branches (14-6) of the pushing rod (14-3) is stretched side way. Then, the branch (14-6) pushes the clamp (14-7). By this pushing power, the two arms (14-8) opens the unfolding wings (14-2) while the clamp (14-7) it self moves to the pivoting joint (14-J) of the unfolding wing (14-2).

As the clamp (14-7) approaches to the pivoting joint (14-J) of the unfolding wing (14-2), the spring limits the open angle between the two arms (14-8) of the clamp (14-7). As the pivot joint (14-K) of the clamp (14-7) reaches to the pivoting joint (14-J) of the unfolding wing (14-2), the upper wings (14-2-U) turns downward and falls side of the car.

Folding of the cover sheet (2) is proceeded as the reverse of the movements described above.

Figure 20:
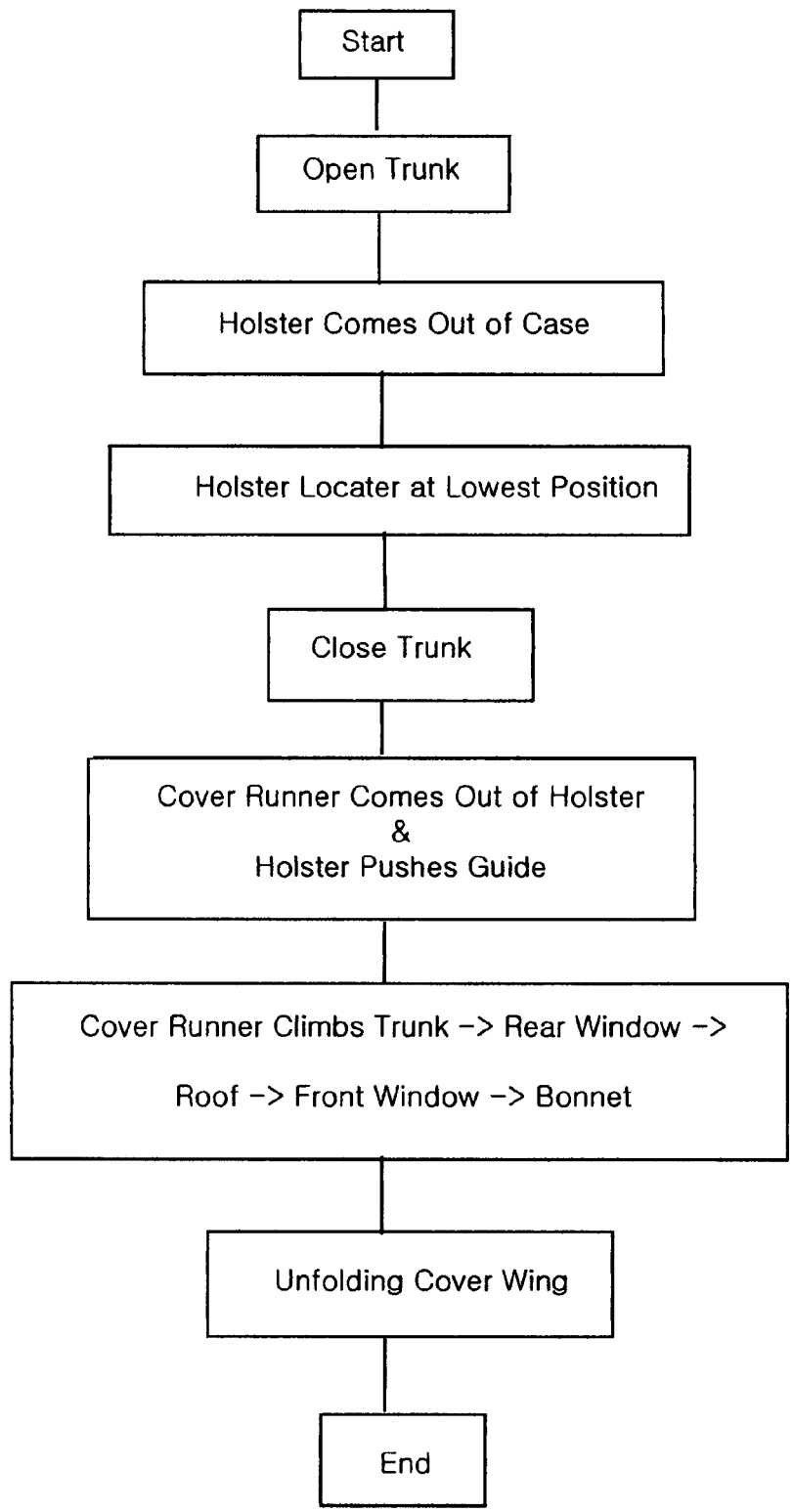
FIG. 20 is a schematic flow sheet of deploying the car cover according to current application.

FIG. 20 is a schematic flow sheet of deploying the car cover according to current application. The sequence of deploying the car cover of the current application is comprised of; 1) open the trunk lid (5) of the car, 2) the holster (4) comes out of the holster case (8), 3) the holster (4) lactates at the lowest position, 4) close the trunk lid (5), 5) the cover runner (1) comes out of the holster (4) and holster pushes the guide (3), 6) the cover runner (1) climbs up the trunk lid (5), climbs up the rear window (15), roof of the car, climbs down the front window, and at the front bonnet, 7) unfold the cover wing (14-2).

Figure 21:
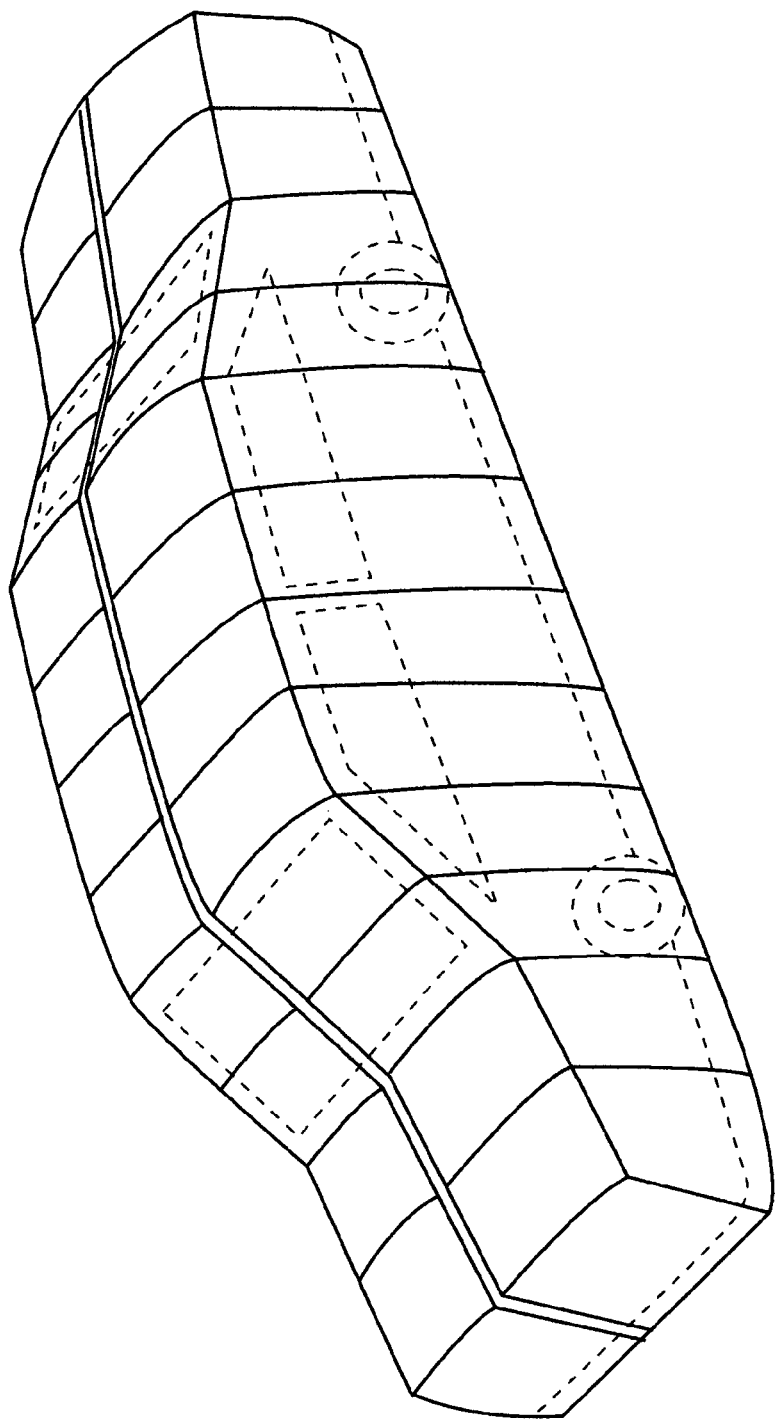
FIG. 21 is a perspective drawing of a car fully covered by the car cover according to current application.

FIG. 21 is a perspective drawing of a car fully covered by the car cover according to current application.

Figure 22:
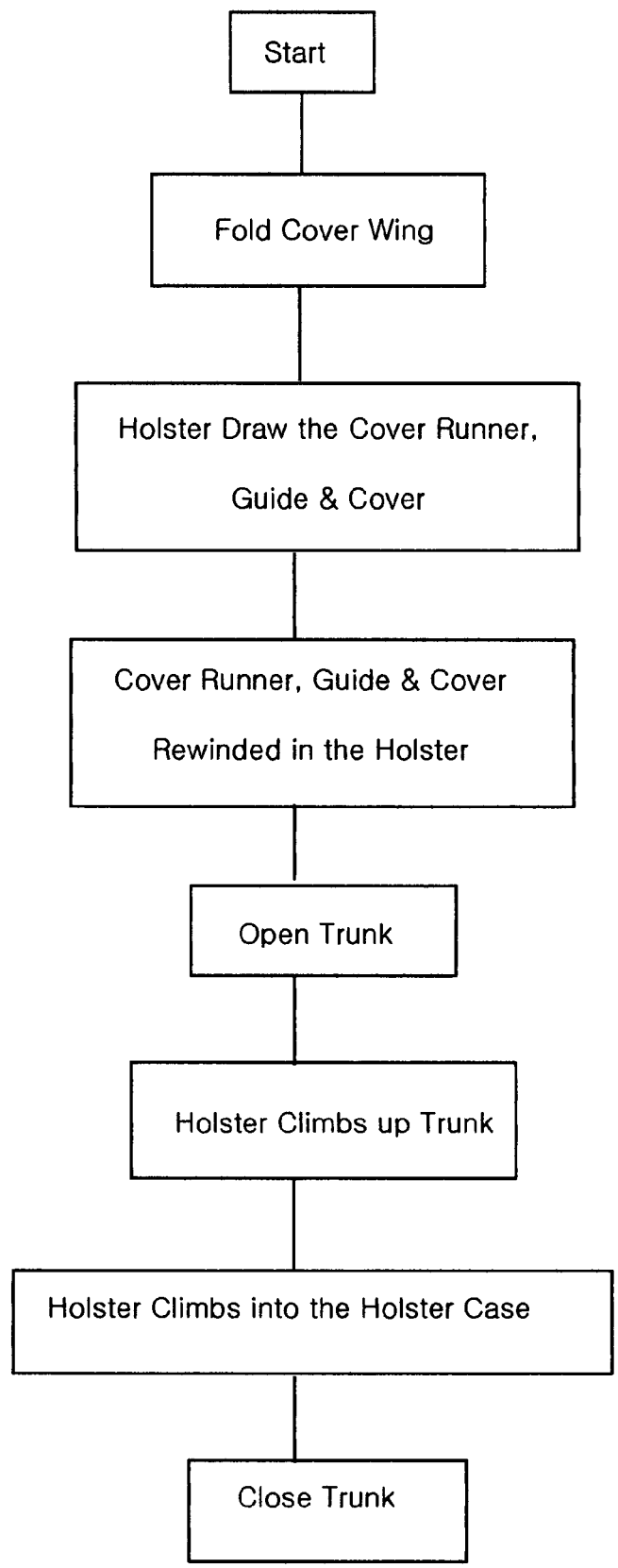
FIG. 22 is a schematic flow sheet of rewinding the car cover according to current application.

FIG. 22 is a schematic flow sheet of rewinding the car cover according to current application. The sequence of rewinding the car cover of the current application is comprised of; 1) fold the cover wing, 2) holster (4) draws the cover runner (1), the guide (3), and the cover sheet (2), 3) the cover runner (1), guide (3) and the cover sheet (2) are rewinded in the holster (4), 4) open the trunk lid (5), 5) the holster (4) climbs up the trunk, 6) the holster climbs into the holster case (8), 7) close the trunk lid (5).

The automatic car cover according to current application enables owners of a fancy cars to cover their cars automatically with just one button touch, which was impossible before the current invention.

What is claimed is:

1. An automatically deploying car cover system for a car equipped with an automatic opening and closing truck, the system comprising:
    a cover runner comprised of an upper panel, two endless tracks, a front cross shaft, a rear cross shaft, a power transfer shaft and a first motor;
    wherein the endless tracks are comprised of one or more square plates of anisotropic permanent magnets;
    a guide comprised of a plurality of interconnected members, wherein said guide is connected to said cover runner;
    a cover sheet,
    wherein said cover sheet is connected to said cover runner;
    a cover sheet deploying means,
    wherein said cover sheet deploying means is connected to said cover runner and said cover sheet; and
    a holster comprised of a storage portion and a second motor,
    wherein said storage portion is configured to receive and deploy said cover runner, guide, cover sheet and cover sheet deploying means.

2. The system of claim 1, wherein each of said one or more square plates of anisotropic permanent magnets has a magnetic flux density of greater than 7000 Gauss.

3. The system of claim 1, wherein each endless track of said two endless tracks is comprised of a conveyer belt, wherein said conveyer belt is comprised of a rubbery polymer forming a circular band shape.

4. The system of claim 3, wherein said conveyer belt is further comprised of a plurality of evenly spaced cells.

5. The system of claim 4, wherein said conveyer belt is further comprised of a plurality of slits, wherein each slit of said plurality of slits is located in a space existing in between each of said evenly spaced cells.

6. The system of claim 4 wherein each cell of said plurality of evenly spaced cells is comprised of one or more square plates of the anisotropic permanent magnets.

7. The system of claim 1, wherein said first motor and said second motor are configured to operate in conjunction with one another to enable deployment and refraction of said cover sheet.

8. The system of claim 1, wherein said guide is configured to assist in the deployment and retraction of said cover sheet.

9. The system of claim 1, wherein said holster is configured to be received within the trunk of a car.

* * * * *